US 6,936,771 B2
(12) United States Patent
Sinha et al.

(10) Patent No.: US 6,936,771 B2
(45) Date of Patent: Aug. 30, 2005

(54) SUPERCONDUCTING CABLE TERMINATION (75) Inventors: Uday K. Sinha, Carrollton, GA (US); Jerry Tolbert, Newnan, GA (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 10/492,385

(22) PCT Filed: Oct. 2, 2002

(86) PCT No.: PCT/US02/31382

§ 371 (c)(1),
(2), (4) Date: Apr. 12, 2004

(87) PCT Pub. No.: WO03/034447

PCT Pub. Date: Apr. 24, 2003

(65) Prior Publication Data

US 2004/0211586 A1 Oct. 28, 2004

Related U.S. Application Data (60) Provisional application No. 60/329,234, filed on Oct. 12, 2001.

(51) Int. Cl.$^7$ .............................................. H01B 12/00
(52) U.S. Cl. .................. 174/125.1; 174/15.4; 174/15.5; 505/163; 505/200
(58) Field of Search ............................... 174/15.1–15.6, 174/125.1; 505/100, 150, 163, 210, 220–223, 230, 885–888; 29/599; 333/99 S; 62/51.1, 259.2

(56) References Cited

U.S. PATENT DOCUMENTS

| 3,902,000 | A | | 8/1975 | Forsyth et al. |
| 3,919,571 | A | * | 11/1975 | Ross ........................ 310/40 R |
| 4,485,266 | A | | 11/1984 | Minati et al. |
| 5,040,373 | A | | 8/1991 | Minovitch |
| 5,317,296 | A | | 5/1994 | Vermilyea et al. |
| 5,856,769 | A | * | 1/1999 | Kiser ......................... 333/174 |
| 5,978,548 | A | * | 11/1999 | Holmstrand et al. ........ 392/397 |
| 6,034,324 | A | | 3/2000 | Dixon et al. |
| 6,049,036 | A | | 4/2000 | Metra |
| 6,154,103 | A | * | 11/2000 | Scharen et al. ........... 333/99 S |
| 6,262,375 | B1 | * | 7/2001 | Engelhardt et al. ....... 174/125.1 |

FOREIGN PATENT DOCUMENTS

GB    2350475 A   * 11/2000    ......... H02G/15/068

* cited by examiner

Primary Examiner—K Cuneo
Assistant Examiner—Tuan Dinh
(74) Attorney, Agent, or Firm—Smith, Gambrell & Russell, LLP

(57) ABSTRACT

Disclosed is a termination that connects high temperature superconducting (HTS) cable immersed in pressurized liquid nitrogen to high voltage and neutral (shield) external bushings at ambient temperature and pressure. The termination consists of a splice between the HTS power (inner) and shield (outer) conductors and concentric copper pipes which are the conductors in the termination. There is also a transition from the dielectric tape insulator used in the HTS cable to the insulators used between and around the copper pipe conductors in the termination. At the warm end of the termination the copper pipes are connected via copper braided straps to the conventional warm external bushings which have low thermal stresses. This termination allows for a natural temperature gradient in the copper pipe conductors inside the termination which enables the controlled flashing of the pressurized liquid coolant (nitrogen) to the gaseous state. Thus the entire termination is near the coolant supply pressure and the high voltage and shield cold bushings, a highly stressed component used in most HTS cables, are eliminated. A sliding seal allows for cable contraction as it is cooled from room temperature to ~72–82 K. Seals, static vacuum, and multi-layer superinsulation minimize radial heat leak to the environment.

36 Claims, 7 Drawing Sheets

FIG_1

Fig_2

Fig_3

Fig_7

SUPERCONDUCTING CABLE TERMINATION

CROSS-REFERENCE TO RELATED APPLICATION

This application claims the benefit of priority of U.S. Provisional Application No. 60/329,234, filed Oct. 12, 2001.

BACKGROUND OF THE INVENTION

The present invention relates to a termination for connecting superconducting and high temperature superconducting (HTS) cables operating at sub-ambient temperatures to cables operating at ambient temperature.

It is known that superconductors are metals, alloys, or oxides thereof, and in general are compounds having practically zero resistivity below a transition temperature, i.e. the critical temperature. A superconducting cable must be operated below its critical temperature, therefore it is cooled during use by, for example, cryogenic cooling fluids. Metal and alloy superconductors have critical temperatures below 20° K while metal oxide (ceramic) superconductors have higher critical temperatures on the order of 80° K thus distinguishing them from the former materials and separating them into a class known as high temperature superconductors that are used to make HTS cables. Because of the brittleness of high temperature superconductors, the cable making material is presently manufactured in the form of tapes known as HTS tapes.

Because of their negligible resistance, superconducting power cables lose only about one-half percent of power during transmission, compared to a 5 to 8 percent loss of traditional power cables and deliver about three to five times more power through the same area than traditional power cables. As the rapid growth of urban areas increases demand for electricity, the ability of HTS cables to transmit more power while using equivalent amounts of space as traditional cables are increasingly important.

To be useful, a superconducting cable must have terminations such that the cold superconductor may be connected to a conventional resistive conductor in an ambient temperature environment. The two primary functions carried out by a superconducting cable termination are providing transition from the cryogenic superconducting environment to ambient conditions and transitioning the large radial voltage gradient in the cable to the much lower gradient tolerable after termination.

Generally, an HTS cable has a coaxial configuration comprised of an energized inner superconductor (phase or line), at least one layer of electrical insulating material, and an outer layer of superconductor placed at zero potential (neutral, ground, or shield). Multiple layers of energized superconductor and electrical insulation may be present in some cables to transmit three phase power. An HTS cable is generally made by winding HTS tapes over a hollow tube known as a former. The former provides mechanical support for the HTS tapes and electrical insulation as well as a path for cryogenic fluid circulation from one end of the cable to the other for cable cooling. The coolant, in some HTS cable designs, permeates the cable structure and thereby becomes an important part of the electrical insulation. In this function, the coolant must also be kept at a pressure where bubbles do not form during operation and the coolant pressure may then be above ambient pressure. HTS cable is housed in a conduit with thermal insulation to keep the cable at the desired temperature and having sufficient strength to accommodate the pressure of the cooling fluid and protect the cable from harm. The conduit also provides an additional path for cryogenic fluid circulation from one end of the cable to the other for cable cooling. Terminations are located on each end of the HTS cable to affect the transition from the superconducting cable, generally cooled by pressurized cryogenic fluid such as liquid nitrogen, to external bushings at ambient temperature.

Various types of terminations have been used in the prior art, but these terminations are complex, subject to stress and susceptible to failure.

A common prior art design has two sets of bushings, a cold bushing and a warm bushing, at two separate boundaries. At the first boundary the cold bushing separates the HTS cables cooled by cold, pressurized liquid nitrogen from another region that is warmer and either is in a vacuum or is filled with an insulating gas such as nitrogen or SF6. At the second boundary the warm bushing separates the vacuum or insulating gas region from ambient conditions (i.e. 295° K and one atmosphere). The cold bushing in such designs is a highly stressed component and prone to failure. The bushing experiences significant thermal/mechanical stresses during cooldown of the cable and must be designed for cable current (several kA) and, for the inner conductor, has to have sufficient solid insulation for the rated voltage (~10–100 kV). The bushing must also have sufficient electrical insulation to withstand the rated voltage.

In one known embodiment, described by C. Bogner in "Transmission of Electrical Energy by Superconducting Cables", pages 5145–16 in S. Foner and B. B. Schwartz ed., *Superconducting Machines and Devices*, NATO Advanced Study Institute, Entreves, Italy, 1973, Plenum Press (1974) a terminal for a single-phase superconducting cable comprises a vacuum container inside which a casing filled with low-temperature liquid helium is disposed.

U.S. Pat. No. 6,049,036 discloses a terminal for connecting a multiphase superconducting cable to room temperature electrical equipment. The terminal includes a casing with cooling fluid, inside which three cable superconductors are connected with a resistive conductor the end of which is connected to the room temperature equipment phases at the outside of the casing. The design features internally cross connections between the three shield conductors at the cold end eliminating the need for the shield conductors to ambient conditions, although an external connection is provided to establish ground potential. In this design, the internal portion of the resistive conductor ends are filled by gaseous coolant that forms an interface with the liquid coolant somewhere along the resistive conductor and this interface is held in place by gravity, thus vertical orientation is required in this invention. Further, this invention has a high voltage insulator that forms a vacuum boundary that extends from room temperature to coolant temperature.

U.S. Pat. No. 4,485,266 discloses a termination for connecting a single coaxial superconducting power transmission line to an ambient bushing that operates in the horizontal position. The invention has a completely sealed horizontal conduit that connects the cold superconducting cable to a room temperature sulfurhexafluoride insulated bushing. The sealed conduit is a very complex structure that provides electrical insulation between phase and shield as they warm and transition to normal conductors, each of which has its own independently cooled heat exchanger that controls the temperature gradient along the conductor.

U.S. Pat. No. 3,902,000 discloses a termination for connecting a single coaxial superconducting cable to an ambient temperature bushing. The patent provides for a low temperature stress cone to expand the dimensions of the insulation prior to encountering the vertical temperature gradient region. This is done because the coolant, helium, has poor dielectric properties in the warm gaseous state. Gaseous coolant is vented from the top of the termination to provide cooling for the temperature transition zone. The inner conductor is connected to a conventional bushing having conventional dielectric fluid at the warm end.

Prior art terminations utilized either vertical configuration or a very complicated horizontal section with independent cooling circuits to control temperature gradients in the transition zone between the superconducting and normal conducting cables. The present invention considerably simplifies the design of terminations for HTS cables by using a unique and innovative technique employing the thermal gradient along the termination's copper conductors to eliminate the requirement for vertical orientation or independent cooling circuits. This produces an HTS cable that is more reliable due to the inherent simplicity of the termination design.

BRIEF SUMMARY OF THE INVENTION

Superconducting cables consist of one or more electrically insulated superconducting conductors contained in a hermetically sealed thermally insulated conduit. Said superconducting cable being maintained at a temperature below the superconducting transition temperature by flowing a coolant such as liquid nitrogen through the conduit. Each end of the superconducting cable conduit is connected to a termination that provides a means for connecting external, ambient temperature, normal conductor connectors to the superconducting conductors. Each of the two terminations consists of a set of electrically insulated normal conductors having one end maintained at a temperature below the superconducting transition temperature that is electrically connected to its corresponding superconducting cable and having the other end connected to the internal connector of an ambient temperature bushing. The normal conductors thus have a large temperature difference from one end to the other.

The termination consists of the normal electrically insulated conductors contained in a thermally insulated conduit. The termination conduit consists of three distinct regions. A cold end housing for making connections between the normal conductors and the superconductors. An ambient temperature housing for making connections between the normal conductors and the internal connection of the ambient temperature hermetic bushing. A transition duct connects the cold housing and the ambient housing through which the normal conductors and insulators pass. The transition duct is sized so that the insulators and conductors completely fill the duct. Sealant compounds, elastomer seals, and mechanical seals close the gaps between the insulators, conductors, and transition duct. One or more capillary passages through, or parallel to, the termination duct connects the cold housing end to the ambient housing end to maintain pressure equilibrium across the termination duct, thereby limiting liquid coolant from flowing from the cold housing to the warm housing. The conductors and transition duct are of a size and length so as to minimize the heat flow through the normal conductors from the ambient temperature housing to the cold housing.

The present invention is an innovative termination that connects the high temperature superconducting (HTS) cable regions which are immersed in pressurized cryogenic fluid such as liquid nitrogen to the high voltage and neutral (shield) external bushings at ambient temperature and pressure. The termination consists of a splice between the HTS power (inner) and shield (outer) conductors and concentric resistive conductors (copper pipes) in the termination.

There is also a transition from the dielectric tape insulator used in the HTS cable to G-10 insulators used between and around the copper pipe conductors in the termination.

The invention consists of a feed and a return end or terminations designated by the flow of cryogenic fluid. Each termination has a warm and cold end. At the warm end of the termination the copper pipes are connected via copper braided straps to conventional warm external bushings which have low thermal stresses.

Thus, the termination allows for a natural temperature gradient in the copper pipe conductors inside the termination which enables the controlled flashing of the coolant, i.e. pressurized liquid nitrogen to gaseous nitrogen. Thus the entire termination is near the nitrogen supply pressure thereby eliminating the high voltage and shield cold bushings, a highly stressed component used in prior art HTS cables.

The copper conductors transfer heat absorbed from the outside at ambient temperature and heat produced by current passage under a resistive effect, to the cryogenic liquid coolant which passes through the resistive conductors, which heats up and flashes to gas.

Other aspects of the design include: (1) a sliding seal to allow for cable contraction as it is cooled from room temperature to ~72–82 K and (2) specialized seals and static vacuum with multi-layer superinsulation to minimize radial heat leak to the environment.

The present inventive termination can be used by cable manufacturers and the electric utility industry in replacing the overburdened infrastructure of conventional copper cables having oil/paper insulation with a new generation of more efficient HTS cables, especially in urban areas where the higher current density of the HTS conductors would allow increased capacity in existing underground cable tunnels.

One object of the present invention is to provide a simplified HTS cable termination.

It is also an object of this invention to provide an HTS cable termination that does not require a cold bushing.

A further object of this invention is to provide a termination for connecting an HTS conductor and shield to copper conductors for electrical power transmission.

Another object of this invention is to provide for a termination which is near the supply pressure of the cryogenic coolant.

It is a further object of the invention to provide a termination partially formed of pressurized piping made of fiberglass sections.

BRIEF DESCRIPTION OF THE DRAWINGS

FIG. 5(*a*) is a cross sectional view showing one embodiment of a joint between the superconducting cable conduit and the termination conduit.

DETAILED DESCRIPTION OF THE PREFERRED EMBODIMENTS

While the exact design of the superconducting cable may vary, the embodiment of this invention described and illustrated here is for connecting a coaxial superconducting cable consisting of a superconducting center phase conductor and an outer superconducting shield conductor, to a pair of copper conductors that make utilization of the cable for electrical power transmission possible. The present embodiment is designed for continuous 1.25 kA operation at 7.2 kVAC operation and 110 kV BIL and has been operated continuously at 13 kVAC and withstood 120 kV impulse. The same principles can be used to design superconducting terminations and splices that have multiple phase conductors operate at different current and voltage levels.

Figure 1:
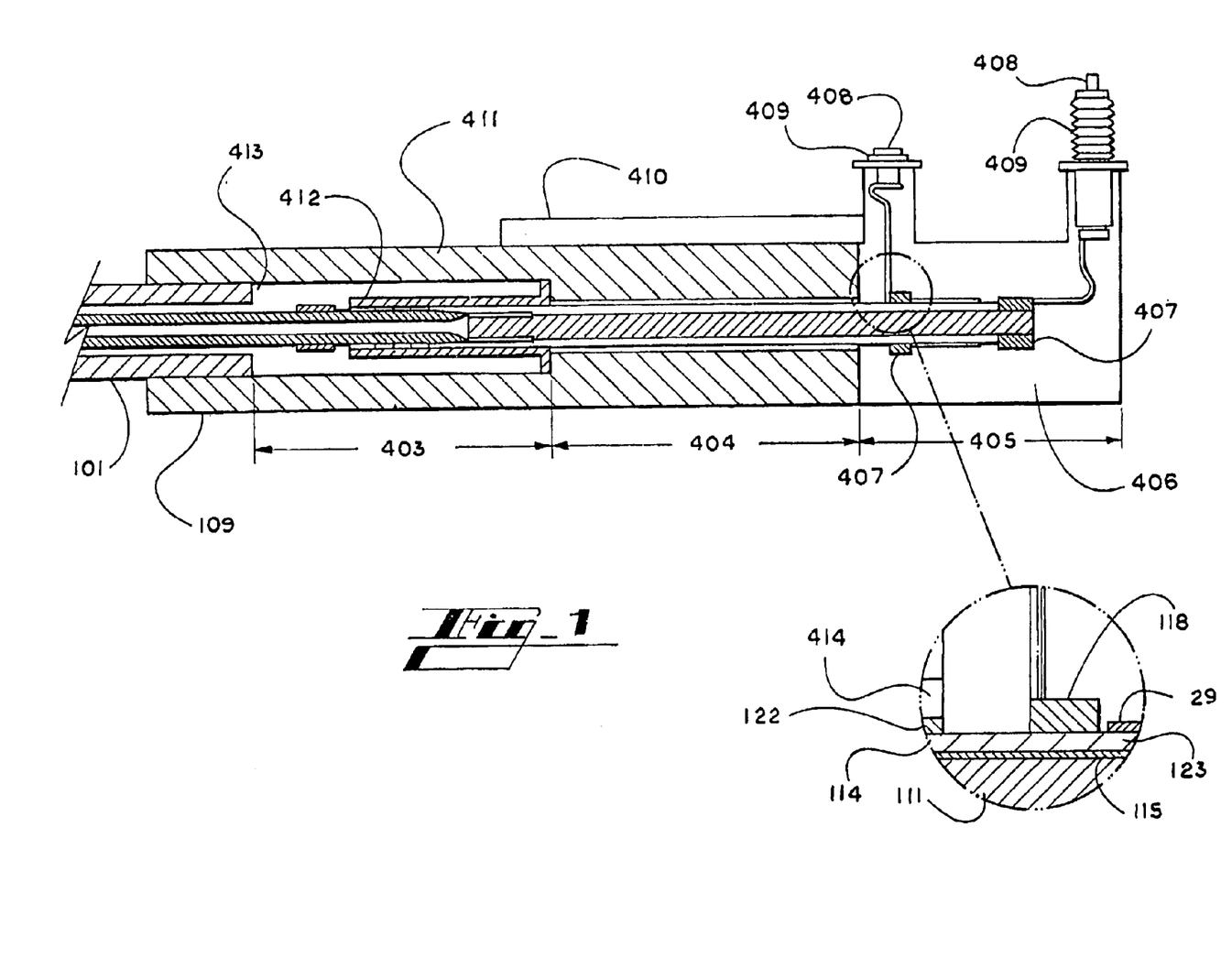
FIG. 1 is a schematic representation of one embodiment of the termination of the present invention.

FIG. 1 shows a schematic representation of the superconducting cable termination of the present invention. Referring to FIG. 1, superconducting cable 101 is shown in the conduit which is surrounded by termination conduit 109. Cold section 403 in termination conduit 109 is filled with coolant 413 and contains splice 412. Thermal insulation 411 surrounds superconducting cable 101 and conduit 109. Transition duct 404 is adjacent cold section 403 and positioned between cold section 403 and ambient temperature section 405. Ambient temperature section 405 contains gaseous coolant 406 at conduit pressure and ambient temperature. Internal connections 407 and external connections 408 are located in ambient section 405. Hermetic bushings 409 are intermediate between external connections 408 and ambient temperature section 405. A pressure equalization capillary 410 connects ambient temperature section 405 and cold section 403. A detail of the internal connections attachment to the splice section end present in ambient temperature section 405 shows thermal insulation 414 adjacent electrical insulation 122 which is adjacent copper pipe conductor 114. Electrical insulation 123 is situated between copper pipe conductor 114 and copper pipe conductor 115. Electrical stress relief material 29 abuts electrical insulation 123 and copper pipe conductor 114. Internal connector 118 is adjacent copper pipe 114 and one of the external connections 408. The superconducting cable is contained in a hermetically sealed, thermally insulated cable conduit. Each end of the superconducting cable conduit is connected to a termination that provides a means for connecting external, ambient temperature, normal conductors to the superconducting conductors. Each of the two terminations are identical except for connections made to accommodate coolant flow. The superconducting cable is maintained at a temperature below the superconducting transition temperature by flowing a coolant, such as liquid nitrogen, through the conduit. The coolant also cools the splice between the superconductor and normal conductor in the termination. The termination consists of a set of electrically insulated normal conductors, shown as copper pipes 114 and 115 in FIG. 1, having one end maintained at a temperature below the superconducting transition temperature that is electrically connected to its corresponding superconducting conductor, in the region the splice 412, and having the other end connected to the internal connector of an ambient temperature bushing. The normal conductors, copper pipes, are contained in a transition duct 404 that has a large temperature difference from one end to the other. Therefore, the termination conduit 109 consist of three distinct regions: a cold section 403 for making connections between the normal conductors and the superconductors, an ambient temperature section 405 for making connections between the normal conductors and the internal connection of the ambient temperature hermetic bushing, and a transition duct 404 connecting the cold section and the ambient section through which the normal conductors and insulators pass. The transition duct is sized so that the insulators and conductors completely fill the duct. Sealant compounds, elastomer seals, and mechanical seals close the gaps between the insulators, conductors, and transition duct. The cold section and transition duct share a common thermally insulated conduit. One or more capillary passages through, or parallel to, the termination duct connecting the cold housing end to the ambient housing end maintain pressure equilibrium across said termination duct, thereby limiting the liquid coolant flow from the cold housing to the warm housing. FIG. 1 illustrates the pressure equalization capillary 410 external and parallel to the transition duct. The conductors and transition duct are of a size and length so as to minimize the heat flow through the normal conductors from the ambient temperature section to the cold section of the termination conduit.

Figure 2:
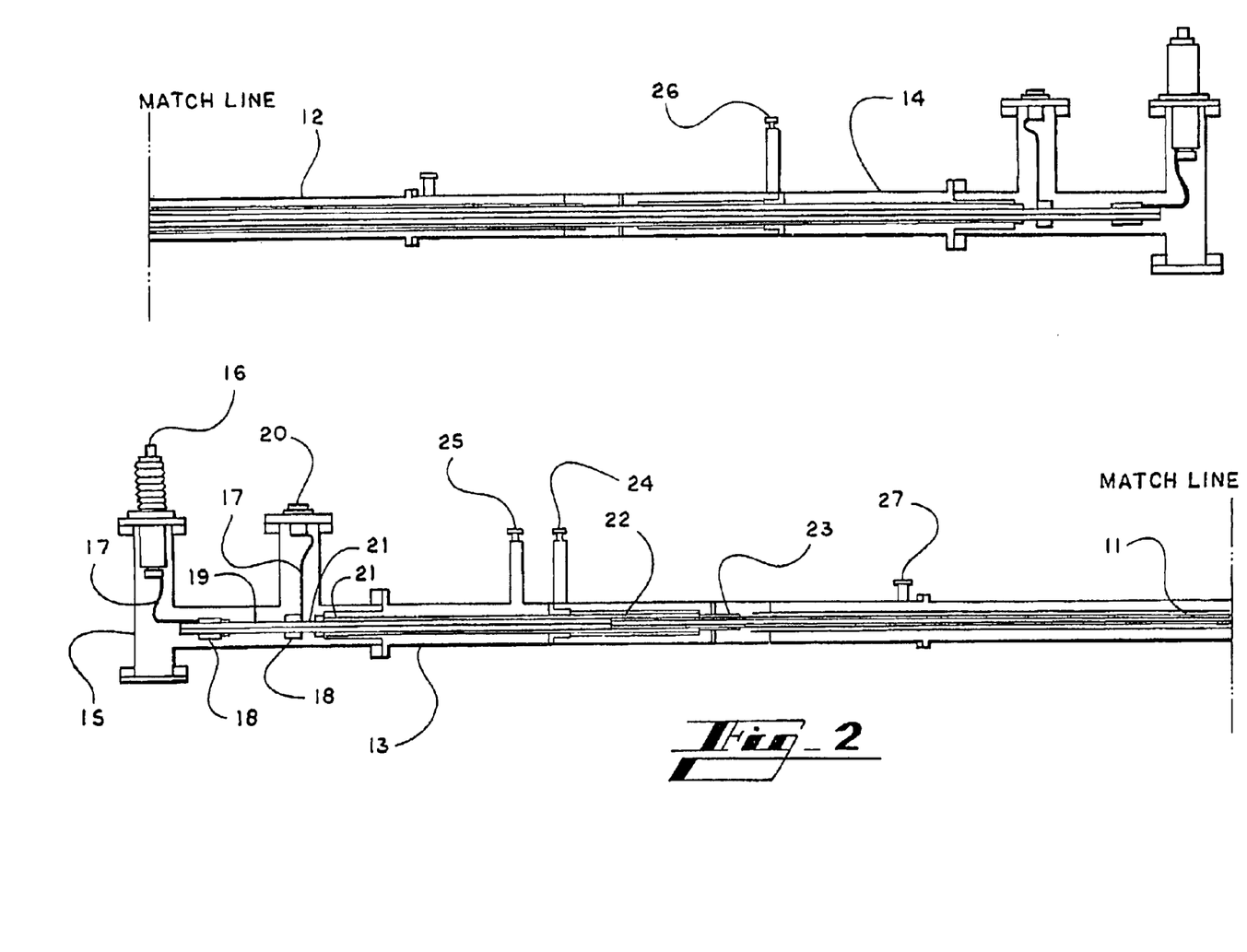
FIG. 2 is a cross sectional view showing an HTS cable with terminations of the present invention.

FIG. 2 shows a simplified representation of an HTS cable with two terminations. HTS cable 11 is housed within cable conduit 12 which is provided with a vacuum jacket that limits radial heat transfer to the cable from the surroundings. HTS cable 11 is normally a multilayer structure wound in a coaxial configuration around a former that is hollow in the center to allow a flow of cryogenic cooling fluid, such as liquid nitrogen. The former may be made of flexible materials, including polymers and metals. Advantageously the former is a stainless steel hose with perforations to allow the cryogenic fluid to surround and permeate the HTS cable. Thermally insulated conduit 12 maintains the cooling fluid at desired operating temperature by retarding heat flow to the coolant, maintains the pressure of the cooling fluid, and protects the cable. The present invention consists of a feed end termination 13 and a return end termination 14. The ends are called terminations in the usual sense of a coaxial cable termination in that they allow the center conductor to be accessed while preventing breakdown to the shield, but they also have the additional functions of accessing coolant to the HTS cable, and interfacing the copper conductor to the HTS conductor.

The designation of feed termination 13 and return termination 14 in FIG. 2 is used in this specific embodiment to refer to the fact that the coolant is circulated in a counter-current manner entering at flow pipe 24 and exiting a flow pipe 25. Hence the designation feed for the termination that interfaces with the external coolant circulation system in the counter-current cooling configuration and the designation return for the termination that internally reverses the coolant flow direction in the counter-current flow configuration. In the counter-current flow configuration, coolant is supplied to pipe 24 and flows through the HTS to normal conductor splice shown in FIG. 1, through the center of the HTS cable from feed termination 13 to return termination 14, where it passes through the HTS to the normal conductor splice to the outside of HTS cable 11, returning to the feed termination 13 through the annular space between HTS cable 11 and the cable conduit 12, then exiting the system through flow pipe 25. The coolant can also be routed in a co-current configuration through the system by introducing it into both flow pipes 24 and 25 and removing it at flow pipe 26 in the return termination. Pipes 24, 25, and 26 may also function as ports for pressure relief, for instrumentation, and for attachment of external pressure equalization capillary for the ambient temperature part of the termination 15. Port 27 is provided to allow external pressure equalization across the joint between HTS conduit 12 and termination conduits 13 and 14. External electrical connections are made in the terminations through hermetic bushings to the phase at 16 and the ground at 20. Within the terminations, the splice between the HTS and normal conductor is made in the cold section of the termination at 22 for the phase and 23 for the shield. Normal conducting copper pipes 21 pass from the cold section to the ambient temperature section of the termination through a duct with sliding seals that allows conductor motion. The duct is either hermetically sealed, if an external pressurization capillary is used, or has an internal flow capillary if internal pressurization is employed. Internal connections between the copper pipe conductors 21 and the hermetic bushings 16 and 20 are made at ambient temperature using internal clamps 18 and copper braid straps 17. Flexible copper braid straps 17 allow the cable to move relative to said hermetic bushings 16 and 20 without transmitting mechanical stress to the bushings. Conversely, flexible copper braid straps 17 allow unconstrained contraction and expansion of the cable with temperature. Electrical stress relief material 19 is applied at the end of the shield copper pipe at ground potential to prevent electrical breakdown across the electrical insulation to the coaxial pipe at phase potential.

Figure 3:
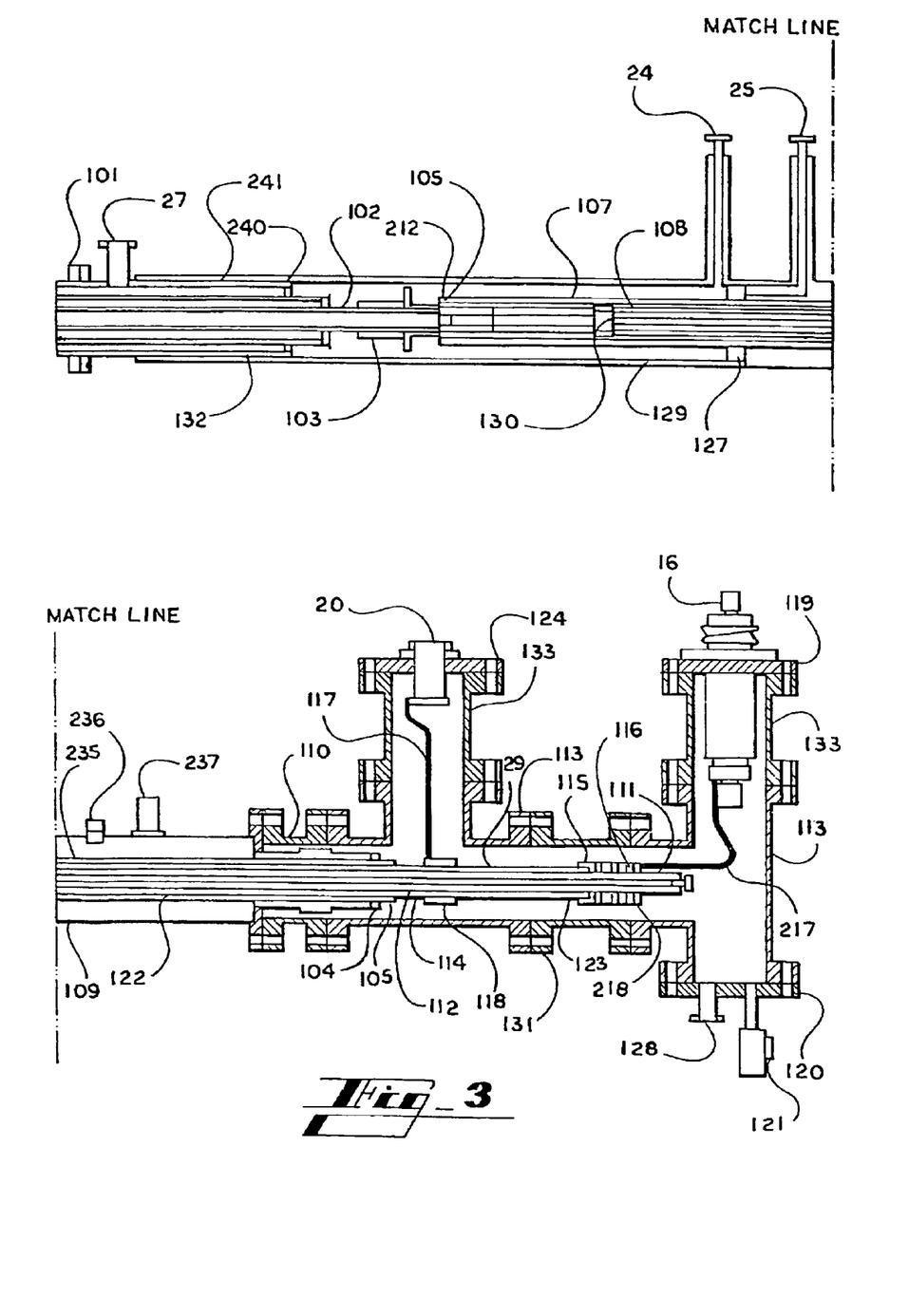
FIG. 3 is a cross sectional view showing one embodiment of the superconducting cable feed termination.
Figure 4:
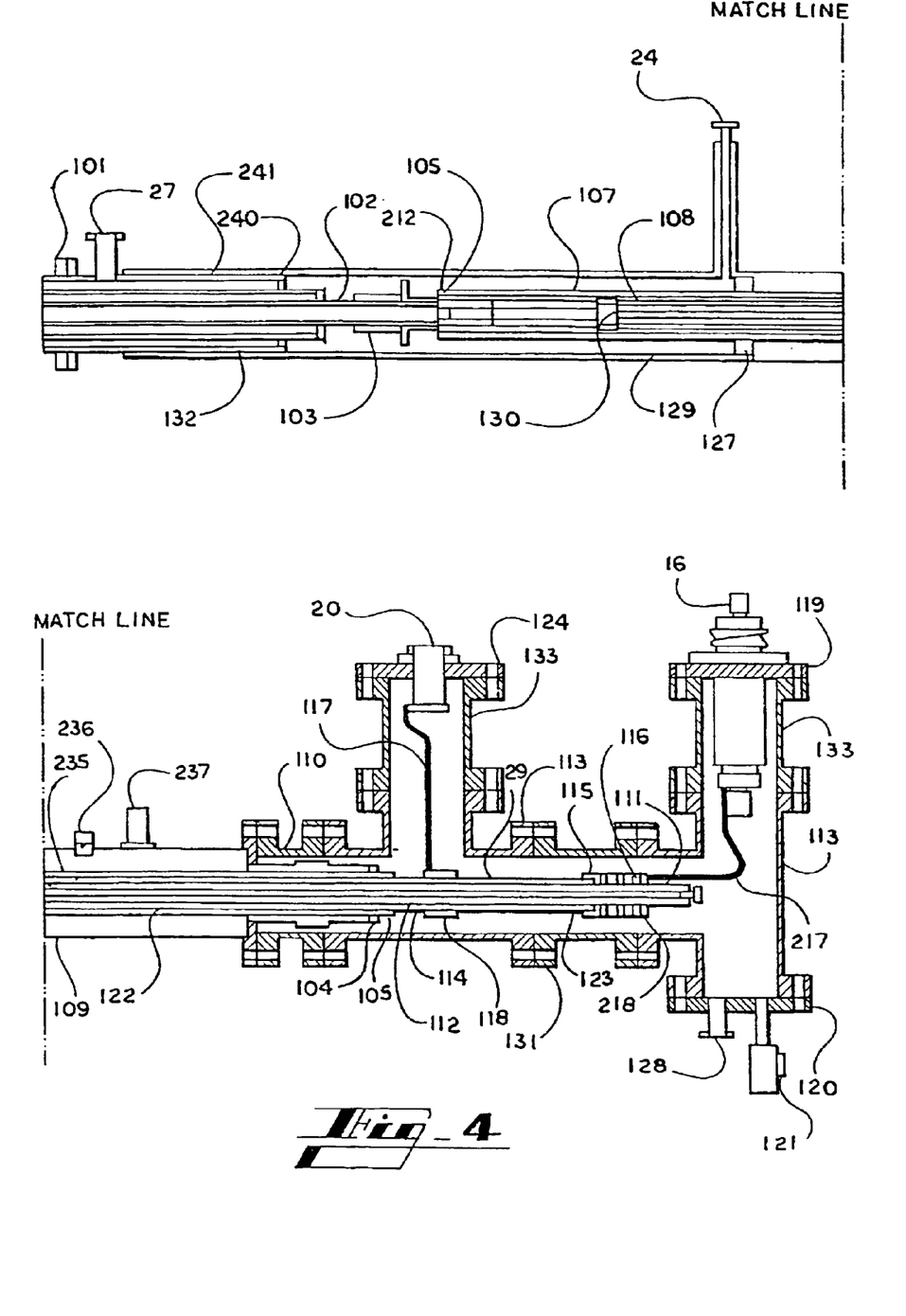
FIG. 4 is a cross sectional view showing an embodiment of the superconducting cable return termination.

FIGS. 3 and 4 show detailed cross sections of the feed and return terminations, respectively. These terminations are identical except for the coolant pipes 24, 25, and 26, the absence of seal 127 in the return termination (FIG. 4), and a difference in outer sleeve 107, details that will be discussed later.

Figure 5A:
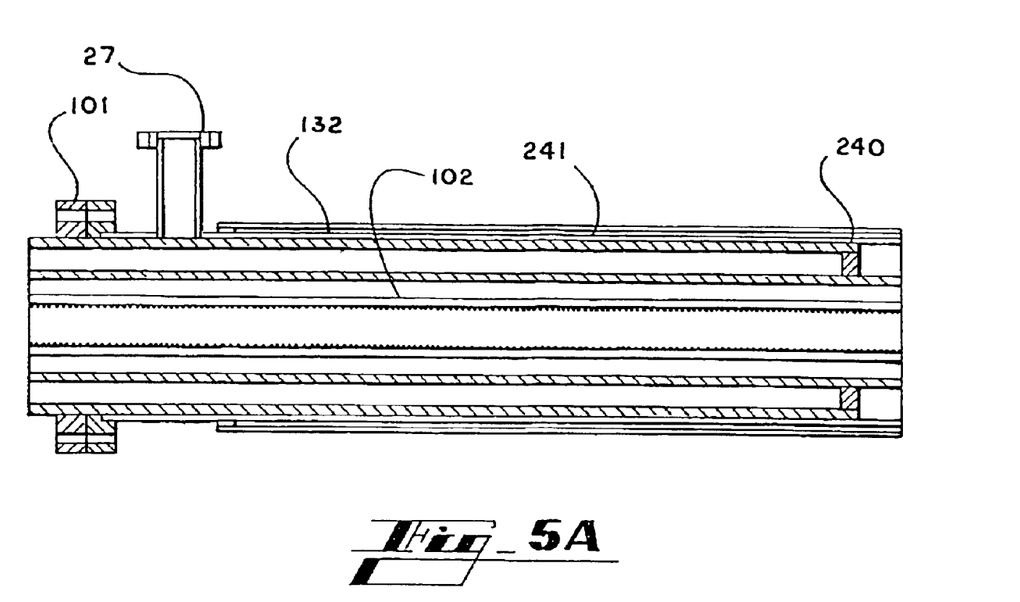
Figure 5B:
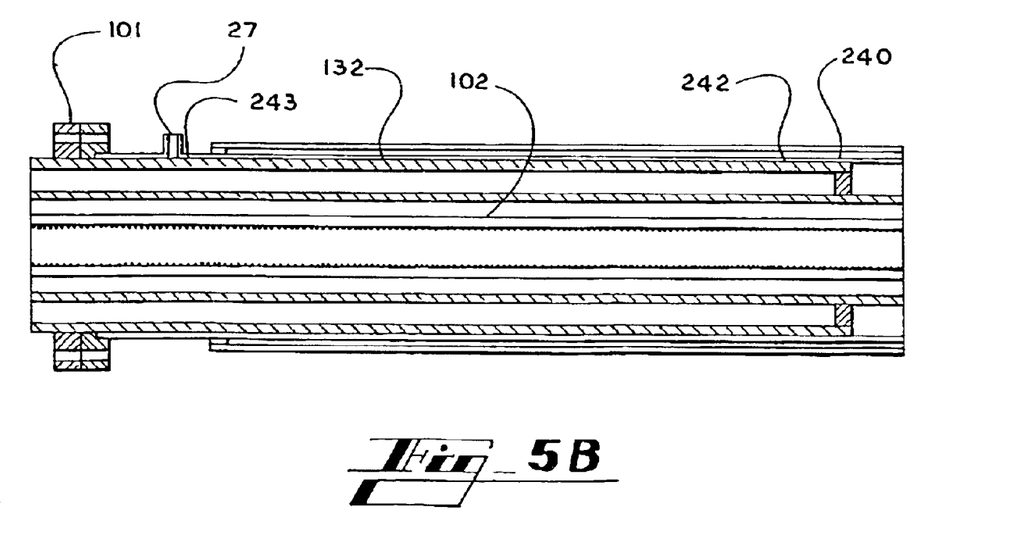
FIG. 5(b) is a cross sectional view showing an alternative embodiment of a joint between the superconducting cable conduit and the termination conduit.

Advantageously the present invention uses a coolant liquid nitrogen, at pressures in excess of atmospheric pressure but less than 150 pound per square inch (psi), therefore 150 psi-class components are used at all pressure boundaries. Referring to FIG. 3, HTS cable 102 is housed in a vacuum insulated cable conduit 132 and interfaces with the termination conduit at flange 101 forming a warm pressure boundary. The annular gap between cable 102 and termination conduit 109, advantageously about 0.1 inch in this embodiment, may be packed with Gore-Tex packing 240 and grease-impregnated fiberglass sleeving 241 as indicated in FIG. 5a. Alternatively, the annular gap may be packed with Gore-Tex packing 240, dry fiberglass sleeving 242, and fiberglass filled grease 243 as indicated in FIG. 5b. Said grease should have properties similar to high temperature silicone grease having a wide temperature range and high dielectric strength. Said fiberglass filled grease is formulated by adding 33% by weight $\frac{1}{32}$" long glass fibers to said grease. Said grease packings form a hermetic seal that prevents coolant from migrating axially down the annulus. Flange 27 may be attached by a capillary to the coolant return line to equalize the pressure across the packing. In an alternate embodiment of the present invention, the termination may be designed to connect vertically upward from the cable, in which case the grease impregnated fiberglass sealed bayonet may be replaced by a standard liquid nitrogen bayonet fitting. Termination conduit 109 in this embodiment also utilizes vacuum thermal insulation. When vacuum insulation is employed the insulating quality of said conduit may be enhanced by placing layers of superinsulation in the vacuum space to reduce radiation heat transfer and getter and/or adsorbent material may be attached to the cold surface internal to vacuum space 235 to help maintain vacuum over long periods of time. Conduit 109 is also equipped with combination pump-out port with a pressure relief plug 236 and a vacuum gauge tube 237, as is commonly done with vacuum insulated cryogenic equipment. Fittings 110, 113, and 131 along with the hermetic bushing and other flanges constitute the housing for the ambient temperature portion of the termination (i.e. 15 in FIG. 2). Advantageously the present invention uses fiberglass and epoxy composite fittings for this purpose. Other materials may be used that provide either adequate standoff or insulation to ground to prevent electrical breakdown to internal high voltage components across the gaseous coolant that provides dielectric strength in this section of the termination. Design of the ambient temperature housing can take advantage of the fact that pressurized liquid nitrogen has a high dielectric breakdown strength. An optional relief valve 121 may be provided to prevent overpressure should liquid coolant enter and suddenly evaporate in this section of the termination. The pressure of the relief valve is selected to give some operating margin above normal system operating pressure and should be sized for maximum boil-off rate during accident conditions. The ambient temperature region is designed to be at ambient temperature when the cable is in service carrying full current. When no current, or reduced current, is applied and coolant flow is continued, the ambient temperature section will cool below ambient temperature. To accommodate this additional cooling, gaskets and other components are selected for service at the reduced temperature. Alternatively, heat may be applied to the system using thermostatically controlled heat blankets or tapes to maintain ambient temperature. Spool piece 110 and other housing components in this region may be made of aluminum, or other high thermal conductivity material, to facilitate heat transfer from surroundings or applied heating elements. Heat transfer to surroundings may also be enhanced by addition of external and internal cooling fins or through the use of heat pipes. These are the basic components of the pressure boundary of said termination. The exact size of these various components is determined such that they can adequately house the termination internals with sufficient clearances to prevent electrical breakdown and interface with the external system.

The sizing of the termination internals beginning with the transition section of the termination is as follows. The conductors and transition duct are of size and length so as to minimize the heat flow through the normal conductors from the ambient temperature housing to the cold housing. The present invention is designed for continuous 1.25 kA operation at 7.2 kVAC operation and 110 kV BIL. Two concentric, electrically insulated, copper pipes carry current through the transition section to the HTS cable phase and shield conductor, FIG. 3, 112 and 114 respectively. The pipes are sized according to the optimization principles outlined by R. McFee in "Optimum Input Leads for Cryogenic Apparatus" pages 98–102 in The Review of Scientific Instruments Volume 30 (1959), but constrained by available pipe sizes and the annular separation required for adequate electrical insulation. Advantageously phase pipe 112 is 1.25 inch ASTM-B-188 standard wall copper pipe (1.25 inch I.D. by 1.66 inch O.D.) and has an optimal length at full current with a temperature gradient from 300° K to 77° K of 54 inches and shield pipe 114 is ASTM F68 2.5 inch O.D. by 0.065 inch wall copper tubing and has an optimal length at full current with a temperature gradient from 300° K to 77° K of 42.5 inches. Optimal lengths are the nominal distances from the copper pipe's respective internal connector to the point that the copper pipe first encounters its respective liquid nitrogen coolant. In the ambient temperature section additional phase pipe length extends under the internal phase connector 218 and additional shield pipe length extends under the internal shield connector 118, plus an additional inch to allow application of the stress control material 29. Internal connectors 118 and 218 are preferably clamshell copper connectors that are bolted to pipes 114 and 112. Internal connectors 118 and 218 advantageously are brazed to flexible copper braids 117 and 217 and said braids have appropriate attachments for interfacing with bushings 20 and 16. Internal phase connector 218 serves the additional function of securing the position of tube 123 and 111, advantageously using set screws. In the cold section additional pipe length extends into the splice to provide adequate surface area for heat transfer for the heat load at full current plus additional length required for mechanical attachments to the superconducting cable. Further additional pipe length may be added to accommodate expansion and contraction of the cable by having more length to move back and forth in the duct. The annular space between the pipes is occupied by tube 123 fabricated of filament wound glass impregnated with epoxy having properties similar to G10. G10 has thermal expansion properties similar to copper and has the electrical strength necessary for 110 kV BILL. Other materials that have suitable mechanical and electrical properties could be used for tube 123. The tube nominally fills the annular space in the transition region and extends to internal connector 218 on the ambient temperature end and into the splice on the cold end. In the ambient temperature region tube 123 has an internal o-ring groove at 115 to inhibit coolant flow through this space. The internal surface tube 123 is wound on copper foil over its full length and the external surface is painted with electrically conductive paint over that part of its length that contacts the copper shield conductor pipe, thus the internal and external surfaces of the tube conduct electricity. The purpose of the electrically conductive coating is to eliminate partial discharge in the very small annular gap at the copper to electrical insulator interface. A small metal shim is placed between the copper pipes and the conductive coating in the ambient temperature region to fix the joined surfaces at the same potential, thus eliminating any possibility of discharge. Advantageously the distance between the end of shield pipe 123 and internal phase connector 115 is greater then about 7 inches and preferably in excess of 8 inches. The edge of shield pipe 114 is sealed to insulating tube 123 using a commercial polymeric stress relief kit 29. Elements of stress relief kit 29 are carefully applied to form a gas tight seal between shield pipe 114 and insulating tube 123. Therefore, stress relief kit 29 has three functions: electrical stress relief, gas flow restriction, and mechanical securing of adjacent elements. Thus the set of conducting pipes (112 and 114) that passes through the transition zone of the termination along with nested insulating tube 123 and plug 111, with internal connectors 118 and 218 in place with stress material 9, forms a rigid assembly that is free to move back and forth as a unit in the insulated conduit.

The transition duct is sized to accept the previously described set of concentric normal conducting pipes and insulating tubes. The insulated conduit 109 in FIGS. 3 and 4 preferably is stainless steel and is grounded in service. Therefore, in order to mitigate the possibility that any internal components would short to conduit 109 in an accident condition, and to provide additional thermal insulation, a G-10 sleeve 122 is installed between the duct wall and the shield conductor pipe 112. Sleeve 122 is of sufficient thickness to meet the BIL rating of the cable. Sleeve 122 is further sized internally to have a free-running fit on shield conductor pipe 112 and externally to allow introduction of sealant compounds. Advantageously the space between G-10 sleeve 122 and insulated conduit 109 is completely filled from end to end with a low temperature addition cured silicone elastomer compound such as Dow Corning 3-6121 Encapsolating Elastomer. The elastomer compound prevents coolant flow in the annular space, thus preventing any undesired convective cooling in this region. The ambient temperature end of sleeve 122 is sealed against gas flow on the shield conductor pipe preferably with a spring-loaded polytetrafluoroethylene (PTFE) reciprocating seal 104, such as Bal Seal 317MB-409. A centering ring 105 is installed next to seal 104 to take up any radial mechanical force. The centering ring is sized to have a free-running fit on shield conductor 112 and is made of a material that has similar thermal-mechanical properties to copper and also has a low coefficient of friction against copper; advantageously a mica-filled PTFE such as Polymer Corporation Fluorosint 500 may be used. Thus, the transition duct is sized so that the insulators and conductors completely fill the duct and sealant compounds, elastomer seals, and mechanical seals close the gaps between the insulators, conductors, and transition duct.

Plug 111 in FIGS. 3 and 4 closes the inside of phase conductor 104. Preferably plug 111 is fabricated of filament wound glass impregnated with epoxy having properties similar to G-10, the center of which is completely filled from end to end with a low temperature addition cured silicone elastomer compound 130, such as Dow Corning 3-6121 Encapsolating Elastomer. Plug 111 may be fabricated entirely of a single material that has relative low thermal conductivity and has thermal expansion properties similar to copper. Plug 111 does not have to be an electrical insulator and can have different embodiments depending on whether an external or internal capillary is used to pressurize the ambient temperature housing. If an external capillary is used plug 111 is advantageously sealed an elastomeric o-ring 116 to form a hermetic seal that impedes gas flow through the annulus between plug 111 and phase conductor pipe 112. If internal pressurization is employed the annulus between plug 111 and phase conductor pipe 112 becomes the capillary passage and is not sealed. Instead, plug 111 advantageously is made to form a loose-running fit with phase conductor pipe 112 that allows ample gas flow for pressurization and a double thread is cut in plug 111, one thread of which is filled with packing 129. The double threads advantageously are 0.5 inch pitch starting 180 degrees apart and are of a depth appropriate of packing (ie. 0.125 inch diameter and 0.1 inch deep designed to receive 0.125 inch diameter GoreTex packing in the preferred embodiment) and a length of 4.5 inches. Both liquid and gaseous coolant are free to flow in one groove and packing 129 prevents flow in the other groove so that a series of equilibrium cells are formed with the state of the fluid in each cell being determined by the temperature of copper phase conductor pipe 112 and the pressure of the coolant. Plug 111 has a further function in that it is sized on the cold end to control forced convection heat transfer of coolant fluid along the inner surface of phase conductor pipe 112.

FIG. 5(*a*) shows the termination to cable joint packing consisting of a grease impregnated fiberglass sleeving and FIG. 5(*b*) shows an alternate joint packing of a fiberglass sleeve filled with grease.

Figure 6:
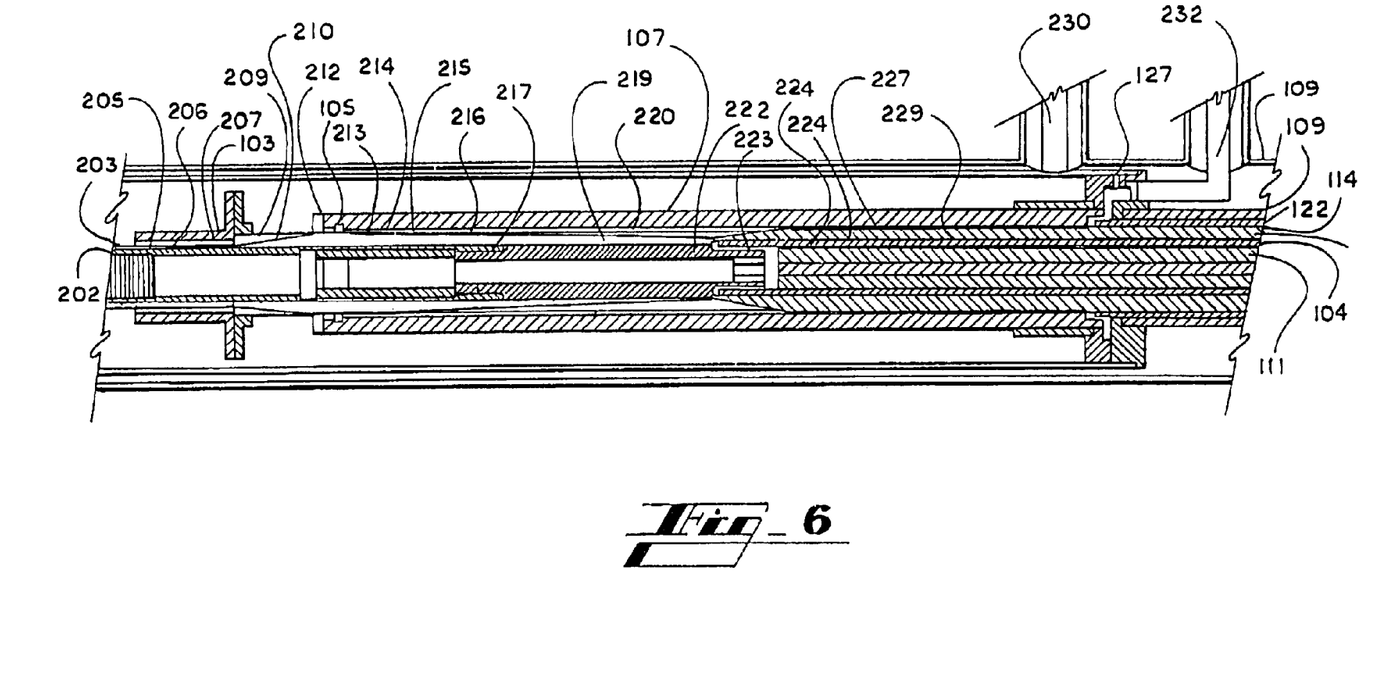
FIG. 6 is a cross sectional view showing an HTS cable to termination splice in detail.

The splice section of the termination, depicted in FIG. 6, provides both electrical connection between HTS and normal conducting elements and cooling for the conductors. The HTS cable is wound on a former 202 and has as its basic elements the HTS phase conductor 203, an electrical insulation package 205, and a coaxial HTS shield 206. The cable end has two copper elements 217 and 222 that are threaded together and to former 202. The HTS phase conductors are soldered to copper end 222. Copper end 222 is threaded to copper phase conductor pipe 104 and locked in place with a jam nut 223. In this embodiment said HTS shield 206 is advantageously covered with a brass sleeve 207 that is clamped onto the cable with bolted copper clamshell connector 103. In other embodiments, said sleeve 207 may be copper and said connection between HTS shield 206 and sleeve 207 may be soldered. Connector 103 is further bolted to said copper shield conductor pipe 114 using a flange that is silver brazed to shield conductor pipe 114. The annular space between copper phase pipe 104 and copper shield pipe 114 is filled with an electrical insulation package that is layered in such a way as to provide electrical insulation, electrical stress relief, and a flow path for coolant. Advantageously copper phase pipe 104 has a ring of holes for coolant flow located at 215 and copper shield pipe 114 has a ring of holes for coolant flow located at 229. The flow path for coolant through the annulus is established by a layer of thin-wall Teflon tubes 216 that are twisted in a helical pattern as the diameter changes such that they form a single dense layer of tubing having no gaps between tubes. The outside of HTS phase conductor 203, its solder joint to copper cable end 222, and end 222 are covered by a single layer of semiconductor tape material. Layers of Cryoflex™ insulation 213 and 219 are then wound over the semiconductor tape to form a cone for Teflon® tubes 216 to lay on and to form an electrical stress relief cone at 210 that extends from HTS shield 206 to copper shield conductor pipe 209. Electrical stress relief cone 210 is formed by a single complete layer of semiconductor tape material held in place by a single complete layer of copper tape having conducting adhesive and over wound with layers of Cryoflex insulation 219 out to the inside diameter of shield conductor pipe 114. Semiconductor tape material from stress cone 107 is extended over the outside surface of Cryoflex insulation layers 213 to Teflon tubes 216 to eliminate electrical stress at holes 215. The outside of Teflon tubes 216 and the tapered section of G-10 sleeve 123 is over wound with layers of Cryoflex insulation to the inside diameter of shield conductor pipe 114. The various layers of electrical insulation and semiconductor tape are fastened in place, when required, by Kapton tape.

FIG. 6 depicts the feed termination. In this termination coolant enters at 232, flows along the outside of copper shield conductor pipe 114 through annular heat transfer gap 227, through holes 215, through Teflon tubes 216, along the outside of copper phase conductor pipe 104 through annular heat transfer gap 225, through holes 229, and then along the inside of copper phase conductor pipe 104 through heat transfer gap 224 to the inside of the cable. Flow through the splice in the return end is in the opposite direction where coolant flows to the outside of the cable and then back to the feed end where it exits through 230. Heat transfer gaps 227, 224, and 225 are sized to maintain the cold section of the termination at the desired operating temperature.

Figure 7:
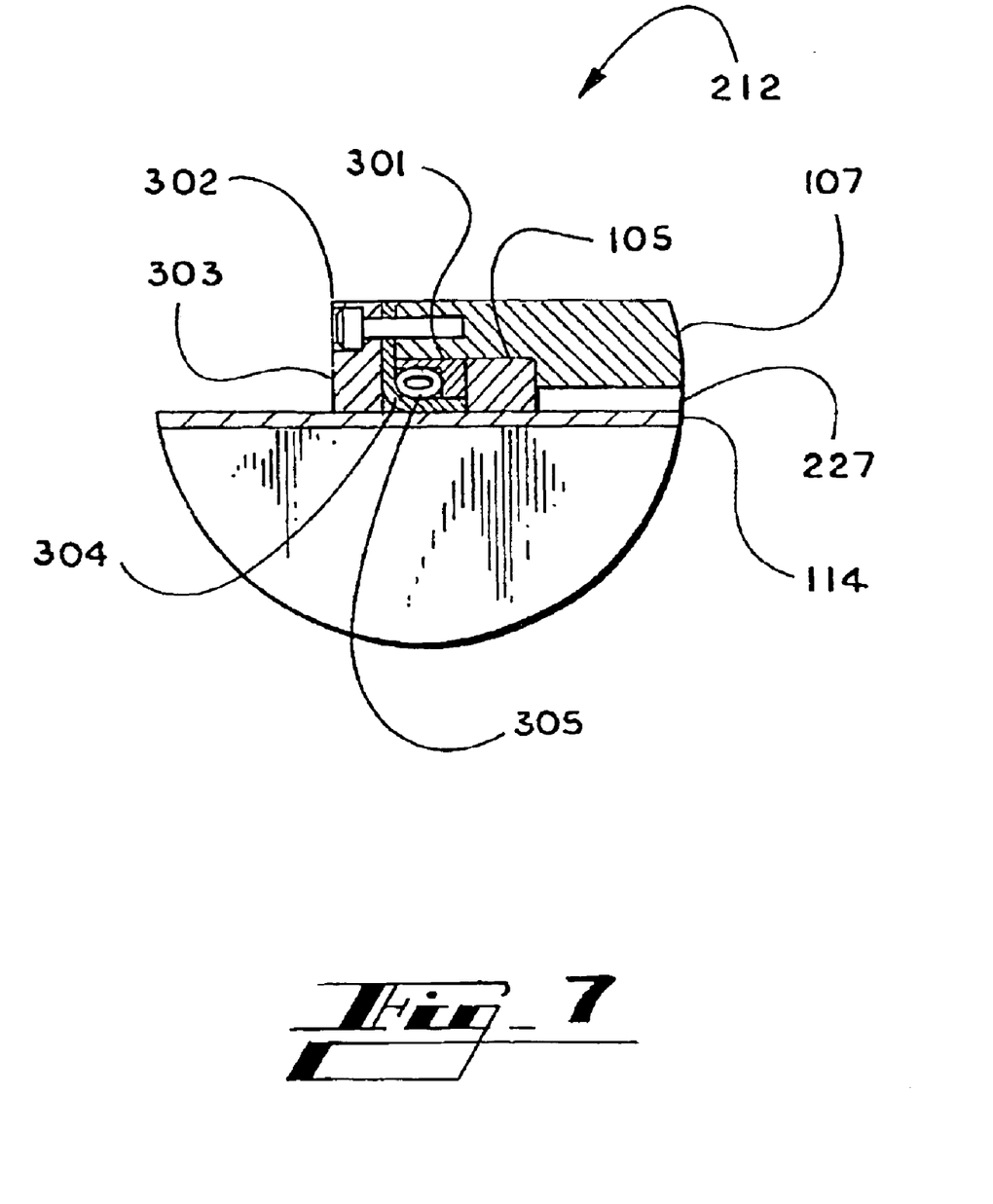
FIG. 7 is a detail of the cold end sliding seal between the coolant jacket and the outer normal conducting pipe.

The outside of heat transfer gap 227 envelope in FIG. 6 is formed by G-10 sleeve 107. Sleeve 107 has a stainless steel flange at one end that is fastened to insulated conduit 109 using bolts. Sleeve 107 differs between the feed and return ends. FIG. 6 depicts the feed end that has a spring-loaded PTFE face seal 127 between G-10 sleeve 107 flange and insulated conduit 109. The return end requires no such seal. The stainless steel flange on G-10 sleeve 107 for the return end, however, has several holes that allow free passage of coolant across the flange from the inside to the outside of the flange. G-10 sleeve 107 has a spring loaded sliding seal 212 that rides against copper shield conductor pipe 114. Sliding seal 212, depicted in FIG. 7, uses 0.062 inch thick GoreTex gasket material 304 to form a seal between G-10 sleeve 107 and copper shield conductor 114. The GoreTex gasket is held in place with cover plate 303 that has a record groove surface to hold the GoreTex gasket in place. GoreTex gasket 304 is energized by a helical spring 305 such as Bal Seal 107LBA-(2.500)-50W-2 spring fitted inside retaining ring 301. Centering ring 105 functions as a sleeve bearing supporting copper shield conductor 114.

Although this invention describes a connector for a single phase superconducting cable, it will be understood by one skilled in the art the above invention is also useable for multi-phase cables.

Although specific embodiments have been illustrated and described, it will be obvious to those skilled in the art that various modifications may be made without departing from the essence of the invention.

What is claimed is:

1. An isobaric superconducting cable termination consisting of:
    a set of normal conducting connectors, one for each superconducting conductor to be joined electrically to an external ambient temperature cable, each termination conductor having a cold end which connects to a respective superconducting conductor and a warm end which connects to a hermetic ambient temperature pressurized bushing, each normal termination conductor being separated from the other by electrical insulators, said termination conductors and the insulators contained in a thermally insulated termination conduit, consists of three parts:
    a) a cold housing for making connections between superconductors and normal termination conductors;
    b) a warm housing for making connections between the normal termination conductors and the internal connection of the ambient pressurized bushing; and
    c) a transition duct connecting said cold housing with said warm housing through which said normal termination and said insulators, said transition duct being sized so that said insulators and conductors completely fill the duct, said insulators and conductors being sealed using sealant compounds, elastomer seals, and mechanical seals so as to prevent liquid coolant from flowing from the cold housing to the warm housing, one or more capillary passages through or parallel to the transition duct connecting said cold housing to an ambient temperature housing to allow gas to flow to maintain pressure equilibrium between said cold housing and said warm housing, said normal termination conductors and said transition duct being of size and length so as to minimize the heat flow through said normal conductors from said ambient temperature housing to said cold housing.

2. The termination of claim 1 in which said normal termination conducts are capable of sliding within said transition duct so as to allow thermal expansion and contraction of a superconducting cable.

3. The termination of claim 1 in which a thermal insulation is provided by a vacuum insulated space surrounding said cold housing and said transition duct.

4. The termination of claim 1 in which said normal termination conductors consist of rigid coaxial pipes.

5. The termination of claim 1 in which the connection between a superconducting cable conduit and said termination conduit is provided by a bayonet coupling sealed by grease packed fiberglass sleeving.

6. The termination of claim 1 further consisting of a coaxial splice connecting coaxial insulated superconductors and coaxial insulated normal conductors, said insulation having a conical passage provided by a set of tubing between said insulators which allows liquid coolant to flow through the insulation layer.

7. A termination for connecting high temperature superconducting (HTS) cable located within a cable carrier to warm external bushings, said HTS cable having inner and outer HTS conductors insulated by a dielectric tape insulator, said termination comprising:
  a vacuum house weldment having first and second ends;
  an inner housing located within said vacuum house weldment, said inner housing connected to said cable carrier and enclosing an end of said HTS cable;
  termination piping sealably connected to said second end of said vacuum house weldment, said piping containing said external bushings;
  an inner resistive conductor extending axially at least partially through said vacuum house weldment, said inner housing and said termination piping, said inner resistive conductor having a cold end and a warm end;
  an outer resistive conductor, coaxial to said inner resistive conductor and separated therefrom by a first insulation sleeve, said outer resistive conductor having a cold end and a warm end;
  connecting means for connecting said inner resistive conductor to said inner HTS conductor and for connecting said outer resistive conductor to said outer HTS conductor;
  cooling means for supplying coolant to the cold end of said inner and outer conductors;
  a first bushing connector located within said termination piping for connecting said inner resistive conductor to a first bushing; and
  a second bushing connector located within said inner housing for connecting said outer resistive conductor to a second bushing.

8. The termination of claim 7 further comprising a flow valve connected to said termination piping for allowing flow of said coolant into said termination piping.

9. The termination of claim 7 wherein said temperature of said termination piping is above the flash temperature of said coolant.

10. The termination of claim 7 wherein said termination piping is connected to said vacuum house weldment by a connection hose.

11. The termination of claim 7 wherein said pressure in said termination piping is equal to said pressure in said vacuum house weldment inner housing.

12. The termination of claim 7 further including superinsulation between said inner housing and said first insulation sleeve.

13. The termination of claim 7 further including a slidable seal allowing expansion and contraction of said inner conductor.

14. The termination of claim 7 wherein said coolant is liquid nitrogen.

15. The termination of claim 7 wherein said termination piping is made of fiberglass-epoxy.

16. A termination for connecting high temperature superconducting (HTS) cable located within a cable carrier to warm external bushings, said HTS cable having inner and outer HTS conductors insulated by a dielectric tape insulator, said termination comprising:
  a vacuum house weldment having a first and second end;
  an inner housing located within said vacuum house weldment, said inner housing connected to said cable carrier and enclosing an end of said HTS cable;
  termination piping sealably connected to said second end of said vacuum house weldment, said piping containing said external bushings;
  an inner resistive conductor extending axially at least partially through said vacuum house weldment, said inner housing and said termination piping, said inner resistive conductor having a cold end and a warm end;
  an outer resistive conductor, coaxial to said inner resistive conductor and separated therefrom by a first insulation sleeve, said outer resistive conductor having a cold end and a warm end;
  tubing extending between layers of said dielectric tape, said tubing for carrying cryogenic cooling fluid between said outer resistive conductor and said inner resistive conductor;
  at least one heat transfer region fluidly connected to said tubing, said at least one heat transfer region for cooling said inner and outer resistive conductors;
  at least one flow pipe extending through said housing to said vacuum house weldment inner housing, said flow pipe for providing flow of said cryogenic cooling fluid within and without said inner housing;
  a first bushing connector located within said termination piping for connecting said inner resistive conductor to a first bushing;
  a second bushing connector located within said inner housing for connecting said outer resistive conductor to a second bushing;
  a first connection means for connecting said inner resistive conductor to said inner HTS conductor;
  a second connection means for connecting said outer resistive conductor to said outer HTS conductor; and
  a coolant source in communication with said inner housing for supplying cryogenic cooling fluid.

17. The termination of claim 16 further comprising a first seal located at the engagement of said at least one flow pipe and said inner housing, said seal for limiting the flow of said cryogenic cooling fluid.

18. The termination of claim 16 wherein said cooling fluid is liquid nitrogen.

19. The termination of claim 16 further comprising a seal located at the connection of said piping and said housing for separating said weldment from said piping.

20. The termination of claim 16 wherein said seal is a sliding seal.

21. The termination of claim 16 further comprising conducting and semiconducting tape wound between and around said HTS inner conductor, said inner resistive conductor, and said outer resistive conductor forming at least one stress cone.

22. The termination of claim 16 wherein said tubing is made of Teflon.

23. The termination of claim 16 wherein said at least one heat transfer region comprises:
  a first zone defined by an annular space between said first insulation sleeve and said outer resistive conductor.

24. The termination of claim 16 wherein said at least one heat transfer region includes:

a second zone defined by an annular space between said first insulation sleeve and said inner resistive conductor.

25. The termination of claim 16 wherein said at least one transfer region includes:

a third zone defined by an annular space between a plug located at the interior of said inner resistive conductor and said inner resistive conductor.

26. The termination of claim 16 wherein said at least one heat transfer region comprises:

a first zone defined by an annular space between said first insulation sleeve and said outer resistive conductor;

a second zone defined by an annular space between said first insulation sleeve and said inner resistive conductor; and a third zone defined by an annular space between a plug located at the interior of said inner resistive conductor and said inner resistive conductor.

27. The termination of claim 16 further including a flow valve connected to said termination piping for allowing flow of said cryogenic cooling fluid into said termination piping.

28. The termination of claim 16 wherein said temperature of said termination piping is above the flash temperature of said cryogenic cooling fluid.

29. The termination of claim 16 wherein said termination piping is connected to said vacuum house weldment by a connection hose.

30. The termination of claim 16 wherein said pressure in said termination piping is equal to said pressure in said inner housing.

31. The termination of claim 16 further including super-insulation between said inner housing and said first insulation sleeve.

32. The termination of claim 16 further including a slidable seal allowing expansion and contraction of said inner conductor.

33. The termination of claim 16 further including a centering ring for maintaining the area of at least one heat transfer zone.

34. The termination of claim 16 wherein said termination piping is made of fiberglass-epoxy.

35. The termination of claim 16 wherein said bushing connections comprise copper braided straps.

36. The termination of claim 16 wherein said inner and outer conductors are copper.

* * * * *

UNITED STATES PATENT AND TRADEMARK OFFICE
CERTIFICATE OF CORRECTION

PATENT NO. : 6,936,771 B2
DATED : August 30, 2005
INVENTOR(S) : Sinha, Uday K. et al.

It is certified that error appears in the above-identified patent and that said Letters Patent is hereby corrected as shown below:

<u>Title page,</u>
Item [75], should read as follows:
-- [75] Inventors: Uday K. Sinha, Carrollton, GA (US);
Jerry Tolbert, Newnan, GA (US);
Ronald R. Martin, Bremen, GA (US);
Paul W. Fisher, Heiskell, TN (US);
Michael J. Gouge, Knoxville, TN (US) --.

Signed and Sealed this

Sixth Day of December, 2005

JON W. DUDAS
*Director of the United States Patent and Trademark Office*